US011157477B2

United States Patent
Raphael et al.

(10) Patent No.: US 11,157,477 B2
(45) Date of Patent: Oct. 26, 2021

(54) HANDLING QUERIES IN DOCUMENT SYSTEMS USING SEGMENT DIFFERENTIAL BASED DOCUMENT TEXT-INDEX MODELLING

(71) Applicant: INTERNATIONAL BUSINESS MACHINES CORPORATION, Armonk, NY (US)

(72) Inventors: Roger C. Raphael, San Jose, CA (US); Rajesh M. Desai, San Jose, CA (US); Fumihiko Terui, Tokyo (JP); Justo L. Perez, Salinas, CA (US); Thomas Hampp, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 328 days.

(21) Appl. No.: 16/202,215

(22) Filed: Nov. 28, 2018

(65) Prior Publication Data
US 2020/0167329 A1 May 28, 2020

(51) Int. Cl.
*G06F 16/21* (2019.01)
*G06F 16/22* (2019.01)

(52) U.S. Cl.
CPC ........ *G06F 16/2272* (2019.01); *G06F 16/219* (2019.01)

(58) Field of Classification Search
CPC ................................ G06F 16/219; G06F 8/65
See application file for complete search history.

(56) References Cited

U.S. PATENT DOCUMENTS

| 7,496,561 | B2 | 2/2009 | Caudill et al. |
| 7,634,466 | B2 | 12/2009 | Rose et al. |
| 8,005,864 | B2 | 8/2011 | Hornkvist |
| 9,703,819 | B2* | 7/2017 | Chi ..................... G06F 16/2474 |
| 9,792,315 | B2* | 10/2017 | Goel ....................... H04L 63/08 |
| 2007/0124277 | A1 | 5/2007 | Chen et al. |

(Continued)

OTHER PUBLICATIONS

He et al., "Compact Full-Text Indexing of Versioned Document Collections", CIKM'09, Nov. 2-6, 2009, Hong Kong, China, pp. 1-10.

(Continued)

*Primary Examiner* — Marcin R Filipczyk
(74) *Attorney, Agent, or Firm* — Kenneth Han

(57) ABSTRACT

A method, computer system, and computer program product for segment differential-based document text-index modeling are provided. The embodiment may include receiving, by a processor, a document with a valid document ID and version ID tuple. The embodiment may also include determining the received document is a new version of a previously stored document and consequently multiplexing versions of the document into a single indexed document. The embodiment may further include segmenting the received document and building a token vector. The embodiment may also include calculating a difference between the received new version of the document and the previously stored document using information obtained from the segmentation. The embodiment may further include in response to the calculated difference being below a pre-configured threshold value, discarding the received new version.

20 Claims, 8 Drawing Sheets

(56) References Cited

U.S. PATENT DOCUMENTS

2011/0202541 A1* 8/2011 Permandla .............. G06F 16/31
707/742
2016/0055143 A1* 2/2016 Goel ....................... G06F 16/24
715/229

OTHER PUBLICATIONS

He et al., "Optimizing Positional Index Structures for Versioned Document Collections", SIGIR'12, Aug. 12-16, 2012, Portland, Oregon, USA, pp. 1-10.
Mell et al., "The NIST Definition of Cloud Computing," National Institute of Standards and Technology, Sep. 2011, p. 1-3, Special Publication 800-145.

* cited by examiner

HANDLING QUERIES IN DOCUMENT SYSTEMS USING SEGMENT DIFFERENTIAL BASED DOCUMENT TEXT-INDEX MODELLING

BACKGROUND

The present invention relates, generally, to the field of computing, and more particularly to electronic document management systems.

An electronic document management system is a digital document management system which allows a user to track, edit, store and manage electronic documents utilizing computer software. An electronic document management system is also capable of keeping a record of the various versions created and modified by different users through history tracking for a given electronic document. Electronic document management systems can manage any type of file format that is stored on the network. Certain systems save copies of documents as images while many electronic document management systems save documents in their native file format. Software has been developed to allow users to find what they want to search in the saved documents with many different versions due to different users' modification or editing. Some software can act like a search engine equipped with search capabilities such as full-text searching and stemming.

SUMMARY

According to one embodiment, a method, computer system, and computer program product for segment differential-based document text-index modeling are provided. The embodiment may include receiving, by a processor, a document with a valid document ID and version ID tuple. The embodiment may also include determining the received document is a new version of a previously stored document and consequently multiplexing versions of the document into a single indexed document. The embodiment may further include segmenting the received document and building a token vector. The embodiment may also include calculating a difference between the received new version of the document and the previously stored document using information obtained from the segmentation. The embodiment may further include in response to the calculated difference being below a pre-configured threshold value, discarding the received new version. The embodiment may also include in response to the calculated difference exceeding the pre-configured threshold value, updating the token vector and an index with a token stream of the received new version of the document.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
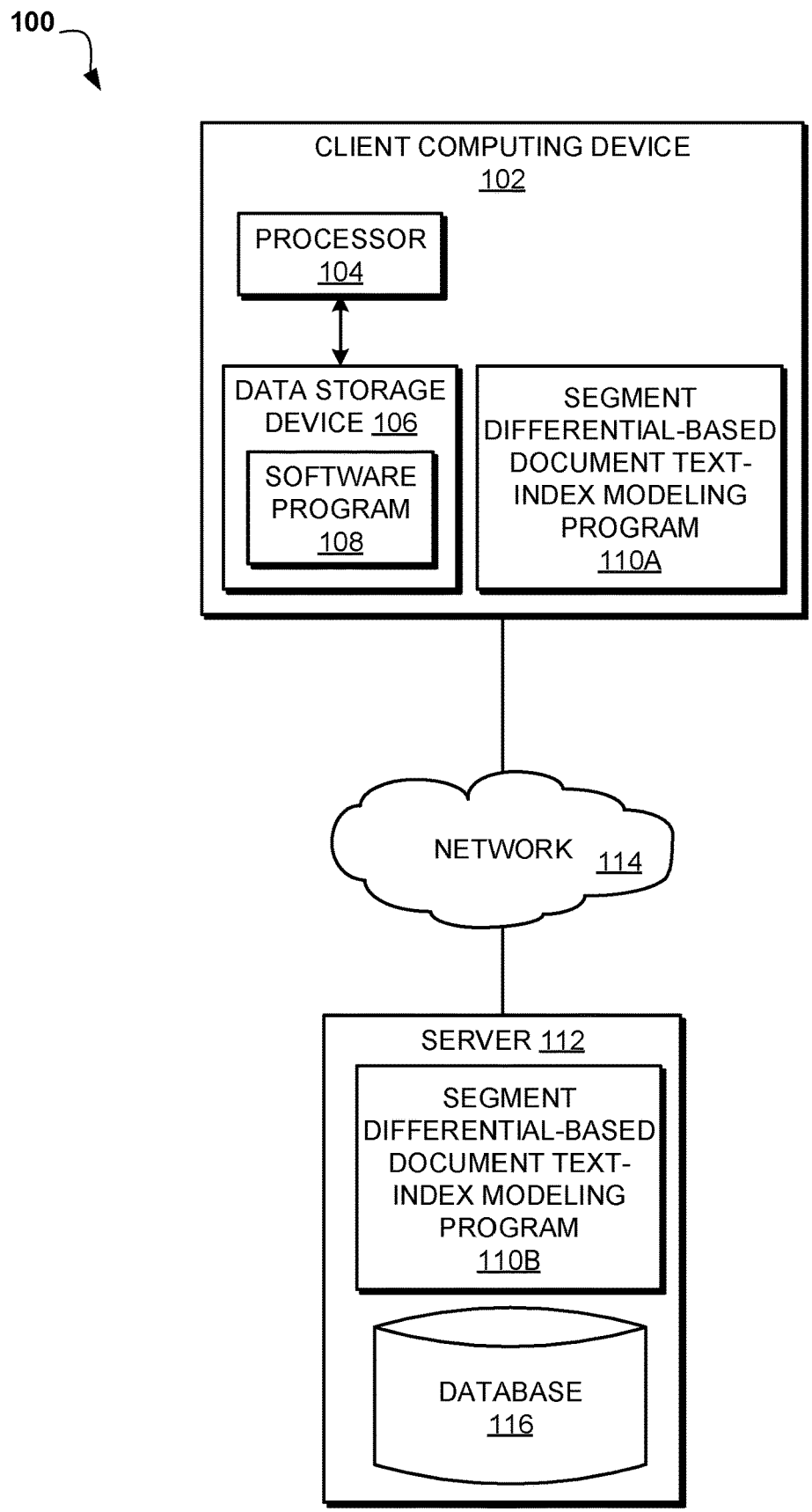
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, information retrieval, text indexing and more particularly to electronic document management systems. The following described exemplary embodiments provide a system, method, and program product to, among other things, tokenize the latest version of a document and to differentiate it from the previous latest version by storing only those segments that have changed, that is, storing only those segments that were added or removed with respect to the previous version of the document. The merged segments are then used to build a tokenized document representing all versions of the document and the tokenized document that was merged may be indexed. Therefore, the present embodiment has the capacity to improve the technical field of electronic document management systems by only storing the difference between document versions, rather than the entire versions of a document separately, thereby saving storage and costs and decreasing a possibility of version explosion. Saving the difference, which captures all the unique segments found in all versions of the document, for the different versions of a document may allow for fast querying of document information specific to a particular version(s).

As previously described, an electronic document management system is a digital document management system which allows a user to track, edit, store and manage electronic documents utilizing computer software. An electronic document management system is also capable of keeping a record of the various versions created and modified by different users through history tracking. Electronic document management systems can manage any type of file format that is stored on the network. Certain systems save copies of documents as images while many electronic document management systems save documents in their native file format. Certain software has been developed to allow users to find what they want to search in the saved documents with many different versions due to different users' modification or editing. Some software can act like a search engine equipped with search capabilities such as full-text searching and stemming.

Today, content management systems based on cloud implementation is very popular. Examples include BOX® (BOX and all BOX-related trademarks and logos are trademarks or registered trademarks of BOX, INC. and/or its affiliates) and Office 365® (Office 365 and all Office 365-related trademarks and logos are trademarks or registered trademarks of Microsoft Corporation and/or its affiliates), etc. One of the key features which the above systems provide is to allow multiple users to collaborate on individual documents remotely using a standard web browser. In this way, a single document may undergo multiple changes by multiple users in rapid succession. This may result in a version explosion which may inundate a system with multiple versions of documents especially when searching for a certain word or sentence. As such, it may be advantageous to, among other things, implement a system capable of providing a mechanism to handle version explosion specifically at the text indexing level and preserving the token difference vector between each version of a document so that a phrase query or span queries on the text index can still be functionally achieved quickly.

According to one embodiment, a document may be analyzed and segmented to determine whether the document is a new version of an already existing document. If the analyzed and segmented version of the document is the same version of the already-existing document, then the segments for the previous same version of the document may be replaced. The new segmented and merged version of the document may also be analyzed to determine whether the difference between the two documents of the same version is trivial or ignorable. If the differences are substantial, then the existing version of the document may be updated. This may be done by building a tokenized document out of the segmented and merged version of the document. Then a new token vector containing the union of merged segments and the captured version-specific information may be loaded into a payload and finally the merged document may be updated in an index.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for tokenizing the latest version of a document to differentiate it from the previous latest version by storing only those segments that have changed and indexing a tokenized document that represent all versions of the document.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a segment differential-based document text-index modeling program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a segment differential-based document text-index modeling program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the segment differential-based document text-index modeling program 110A, 110B may be a program capable of collecting multiple versions of a document, segmenting, parsing and tokenizing the latest version of the document to differentiate from a previous version of the document. The segment differential-based document text-index modeling program 110A, 110B may also discard a new version of a document if the segment differential-based document text-index modeling program 110A, 110B determines that the segment differential is minor or negligible when the difference is below a predetermined threshold value. The segment differential-based document text-index modeling process is explained in further detail below with respect to FIG. 2A through 2C.

Figure 2A:
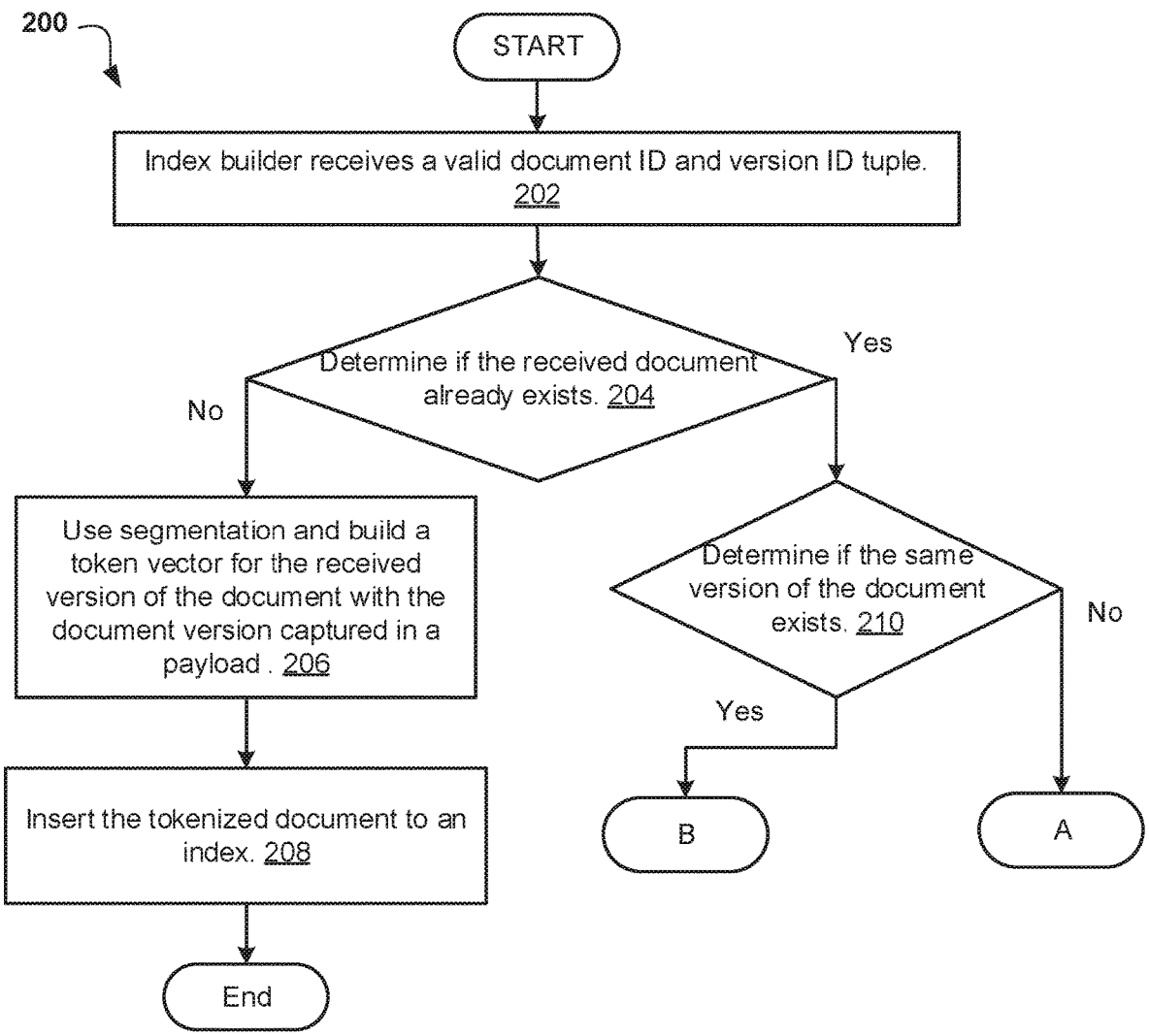
FIG. 2A-2C are operational flowcharts illustrating a segment differential-based document text-index modeling process according to at least one embodiment.
Figure 2B:
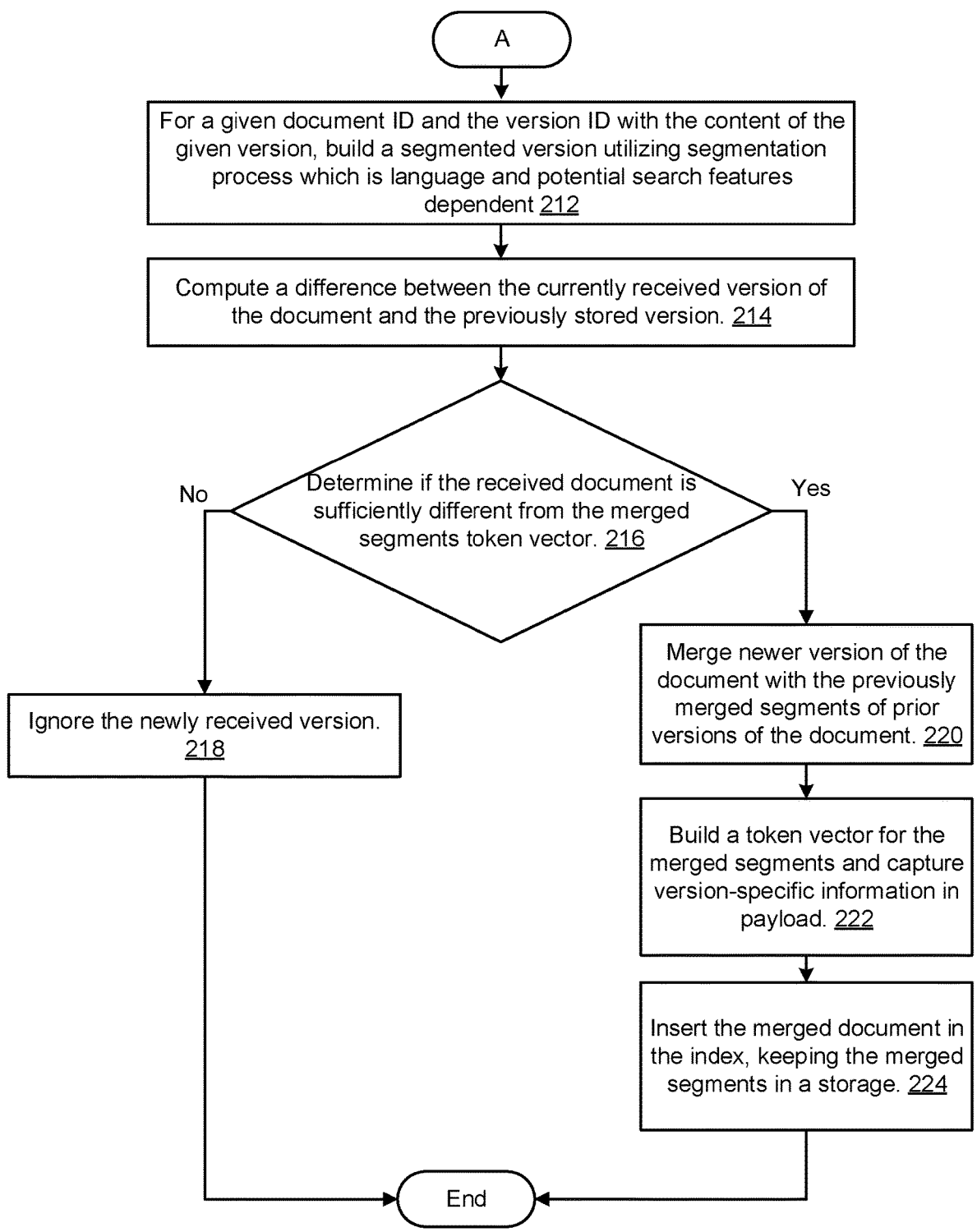
Figure 2C:
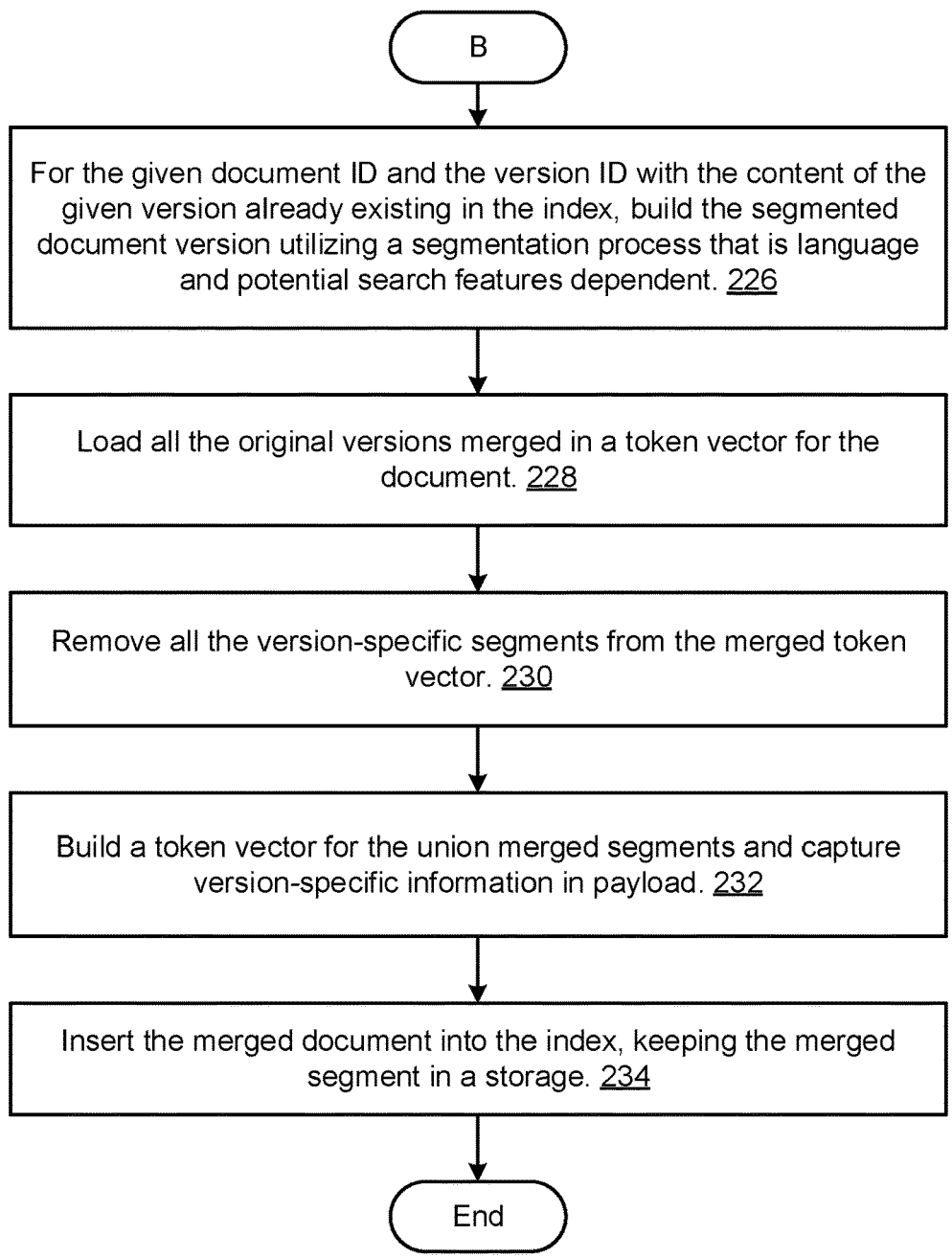

FIG. 2A through 2C are operational flowcharts illustrating a segment differential-based document text-index modeling process 200 according to at least one embodiment. In FIG. 2A, at 202, the segment differential-based document text-index modeling program 110A, 110B receives a valid document ID and a version ID tuple utilizing an index builder. According to one embodiment, the segment differential-based document text-index modeling program 110A, 110B may identify a document's ID and stored version information associated with the identified document. According to one embodiment, the segment differential-based document text-index modeling program 110A, 110B may allow a user to connect to the network 114 and upload any type of documents in various formats, such as .doc, .xml, .ppt, and .pdfetc. on the server 112, the segment differential-based document text-index modeling program 110A, 110B may save the uploaded documents in the database 116.

At 204, the segment differential-based document text-index modeling program 110A, 110B determines if the received document already exists in a database. According to one embodiment, the segment differential-based document text-index modeling program 110A, 110B may analyze the identified document ID and the version ID tuple to determine whether the received document is a new document with no prior versions or a new version of the already-existing document. If the segment differential-based document text-index modeling program 110A, 110B determines that the received document is a new version of a previously stored document (step 204, "Yes" branch), then the segment differential-based document text-index modeling program 110A, 110B may continue to step 210 to further determine whether the same version of the received document exists. If the segment differential-based document text-index modeling program 110A, 110B determines that the received document does not already exist (step 204, "No" branch), then the segment differential-based document text-index modeling program 110A, 110B may continue to step 206 to utilize a segmentation process and build a token vector for the received document with the document version captured in a payload and the segmented document may be stored in the database 116.

At 206, the segment differential-based document text-index modeling program 110A, 110B utilized a segmentation process and build a token vector for the received version of the document. According to one embodiment, the segment differential-based document text-index modeling program 110A, 110B may segment a document into words, sentences or phrases. The segment differential-based document text-index modeling program 110A, 110B may then build a token vector for the received document. For example, the segment differential-based document text-index modeling program 110A, 110B may segment a document into sentences and then tokenize a sentence, such as "This is a sample document." into "This (1) is (2) a (3) sample (4) document (5). (6) <InternalVersionSeparator> (7)". The segment differential-based document text-index modeling program 110A, 110B may further assign a version identifier so that the segment differential-based document text-index modeling program 110A, 110B may store the above tokens in one or more databases as "This (1/1) is (1/2) a (1/3) sample (1/4) documents (1/5). (1/6)"

At 208, the segment differential-based document text-index modeling program 110A, 110B inserts the tokenized document to an index. Based on the above example, the segment differential-based document text-index modeling program 110A, 110B may store the tokenized sentence in an index as follows: following manner:

```
Dictionary -> docid {offset, ...}
a -> 1{3}
document -> 1{5}
is ->1 {2}
sample -> 1 {4}
this -> {1}
```

At 210, the segment differential-based document text-index modeling program 110A, 110B determines whether the same version of the received document exists. If the segment differential-based document text-index modeling program 110A, 110B determines that the same version of the received document already exists (step 210, "Yes" branch), then the segment differential-based document text-index modeling program 110A, 110B may continue to step 226 to further build the segmented document version utilizing a segmentation process that is language and potential search features dependent. If the segment differential-based document text-index modelling program 110A, 110B determines that the same version of the received documents does not already exist (step 210, "No" branch), then the segment differential-based document text-index modelling program 110A, 110B may continue to step 212 to further build the segmented document version utilizing a segmentation process that is language and potential search features dependent.

Referring now to FIG. 2B, at 212, the segment differential-based document text-index modeling program 110A, 110B builds a segmented version utilizing a segmentation process which is language and potential search features dependent. According to one embodiment, the segment differential-based document text-index modeling program 110A, 110B may segment a document into sentences or paragraphs taking into account unique features or characteristics of each language. For example, the segment differential-based document text-index modeling program 110A, 110B may utilize a different segmentation process for a document created in French as opposed to a document created in English. In another embodiment, the segment differential-based document text-index modeling program 110A, 110B may segment a document into words as every word can be a potential search feature excluding special marks at the end of a sentence.

At 214, the segment differential-based document text-index modeling program 110A, 110B computes a difference between the currently received version of the document and the previously stored version in the database 116. According to one embodiment, the segment differential-based document text-index modeling program 110A, 110B may utilize various techniques to determine if the difference between the two version is trivial or negligible. The segment differential-based document text-index modeling program 110A, 110B may calculate the number of words or letters in each version and compare them to each other. The segment differential-based document text-index modeling program 110A, 110B may further pre-configure a threshold value for such differential and if the difference between the two numbers is below the pre-configured threshold value, then such differential may be treated as minor typos or negligible modifications or edits. In at least one other embodiment, the segment differential-based document text-index modeling program 110A, 110B may utilize a lexical analysis technique based on the data stored in a token vector to measure a difference. For example, if a word "are" is found in a new version of a document as an additional token, the segment differential-based document text-index modeling program 110A, 110B may locate and compare the position of the word "are" to the position of "is" in the previous version and determine that the word "are" is mistakenly placed in replacement of "is" or the change is neglible. Further the segment differential-based document text-index modeling program 110A, 110B may determine that an inclusion of a certain word is negligible based on an analysis of term frequency found within a token vector.

At 216, the segment differential-based document text-index modeling program 110A, 110B determines whether the received document is sufficiently different from the previously stored token vector of the merged segments. According to one embodiment, the segment differential-based document text-index modeling program 110A, 110B may determine that the received document is sufficiently different from the token vector of the merged segments when the calculated difference is above a predetermined threshold. The segment differential-based document text-index modeling program 110A, 110B may determine that the received document is not sufficiently different from the segments merged token vector when the calculated difference is below a predetermined threshold. If the segment differential-based document text-index modeling program 110A, 110B determines that the received document is sufficiently different from the token vector of the merged segments (step 216, "Yes" branch), then the segment differential-based document text-index modeling program 110A, 110B may continue to step 220 to merge newer version of the document with the previously merged documents segments. If the term differential-based document text-index modeling program 110A, 110B determines that the received document is not sufficiently different from the token vector of the merged segments (step 216, "No" branch), then the segment differential-based document text-index modeling program 110A, 110B may continue to step 218 to ignore the new version of the document.

At 218, the segment differential-based document text-index modeling program 110A, 110B ignores the newly received version of the document. According to one embodiment, the segment differential-based document text-index modeling program 110A, 110B may discard the most recently uploaded version of a document if the changes contained in the version is determined to be minor or negligible based on comparison to a pre-configured threshold value. For example, if the latest version of a document contains one or more insignificant words than its previous version, then the segment differential-based document text-index modeling program 110A, 110B may discard such latest version of the document in entirety or add only those extra words to an already-existing token vector so that the segment differential-based document text-index modeling program 110A, 110B does not have to save or keep an unneeded document in its entirety, which in turn, will save the limited memory space and costs.

At 220, the segment differential-based document text-index modeling program 110A, 110B merges a newer version of the document with the previously merged segments of prior versions of the document. According to one embodiment, the segment differential-based document text-index modeling program 110A, 110B may merge the segments of the newly received document and merge the segments with all the previously stored segments obtained from all the prior versions of the same document.

At 222, the segment differential-based document text-index modeling program 110A, 110B builds a token vector for the merged segments and capture version-specific information in payload. According to one embodiment, the segment differential-based document text-index modeling program 110A, 110B may update an already existing token vector if an uploaded document is another version of an already existing document. The segment differential-based document text-index modeling program 110A, 110B may create a new token vector if a newly uploaded document is not a new version of any of the previously stored documents. In at least one other embodiment, the updated or created token vector may contain the list of terms with token position and payload such that the payload may indicate the term is valid for a certain version based on a position offset. For example, if the segment differential-based document text-index modeling program 110A, 110B checks the terms from beginning of both token streams from two versions of a document and determines that both streams have the same terms at the same positions, then the segment differential-based document text-index modeling program 110A, 110B may store the terms without extra information. However, if a term is modified at a position, the segment differential-based document text-index modeling program 110A, 110B may store the new term with a payload indicating that this term is only valid after a certain version number and add the previous term with a payload indicating this term is only valid before a certain version. If a term is inserted at a particular position, the segment differential-based document text-index modeling program 110A, 110B may store the term with a payload indicating this term is only valid from or after the version 2 and record its offset difference as +1 for the version 1. If a term is removed from a position, the segment differential-based document text-index modeling program 110A, 110B may then store the term with a payload indicating that this term is only valid before or from version 1 and record the offset difference as −1 so that a user may know where or when the term was removed. The segment differential-based document text-index modeling program 110A, 110B may place a special character at the end of the term when the term is added again in a later version. In at least one other embodiment, the segment differential-based document text-index modeling program 110A, 110B may store a token stream as one data unit when a token stream reaches to some point where position difference does not seem to have any effect on searching for particular terms. For example, such a position may include a sentence end or period mark at the end of a paragraph. On the other hand, if a difference between two token streams is too large or above a pre-configured threshold value, those two token streams may be stored as entirely different token vectors.

At 224, the segment differential-based document text-index modeling program 110A, 110B inserts the merged document in the index, keeping the merged segments in a repository, such as database 116. According to one other embodiment, the segment differential-based document text-index modeling program 110A, 110B may modify term strings by adding special characters or marks if the term was added or deleted from the second latest version of a document. For example, a word "computer" may be added to an inverted index as "computer" if it is valid for the latest version or "computer\1" if it has been removed from the second version of a document but was valid in the first version. The segment differential-based document text-index modeling program 110A, 110B may choose characters that are not found in stored documents as special markers.

Referring now to FIG. 2C, at 226, the segment differential-based document text-index modeling program 110A, 110B builds a segmented version utilizing a segmentation process, which is language and potential search feature dependent. According to one embodiment, the segment differential-based document text-index modeling program 110A, 110B may go through the same, or substantially the same, process as described in step 212 with respect to a newly received version of a document that already has the same version saved in a repository, such as database 116.

At 228, the segment differential-based document text-index modeling program 110A, 110B loads all the original versions merged in a token vector with respect to the same version of the document. The segment differential-based document text-index modeling program 110A, 110B may load a token vector and index of all the previously saved versions of a document. For example, with respect to a tokenized sentence, such as "This (1) is (2) a (3) sample (4) document (5). (6) <InternalVersionSeparator> (7)", if the second version of the sentence is saved as "This is a sample text index document.", adding an extra word, then the segment differential-based document text-index modeling program 110A, 110B may tokenize the second version of the sentence into "This (8) is (9) a (10) sample (11) text (12) index (13) document (14). (15) <InternalVersionSeparator> (16)" or "This (2/1) is (2/2) a (2/3) sample (2/4) text (2/5) index (2/7) document (2/8). (2/9)". If the third version of the sentence is uploaded and saved as "This is a sample for a token", then the segment differential-based document text-index modeling program 110A, 110B may tokenize the modified sentence into "This (17) is (18) a (19) sample (20) for (21) a (22) tokens (23). (24)<InternalVesionSeparator>

(25)" or "This (3/1) is (3/2) a (3/3) sample (3/4) for (3/5) a (3/6) tokens (3/7). (3/8)" if a version identifier is added. The segment differential-based document text-index modeling program 110A, 110B may load the index data as follows:

```
Dictionary -> docid {offset, ...}
a -> 1{3, 10}
document -> 1{5, 14}
index -> 1 {13}
is ->1 {2, 9}
sample -> 1 {4, 11}
this -> {1,8,17}
text -> {12}
```

At 230, the segment differential-based document text-index modeling program 110A, 110B removes all the version-specific segments from the merged token vector. In the above example, version-specific segments are "text" and "index" as they are found in only one version. According to one embodiment, the segment differential-based document text-index modeling program 110A, 110B may update the existing version with a newly received identical version of a document.

At 232, the segment differential-based document text-index modeling program 110A, 110B builds a token vector for the merged segments and capture version-specific information in payload. According to one embodiment, the segment differential-based document text-index modeling program 110A, 110B may build a new token vector for the newly received identical version. The updated or created token vector may contain the list of terms with token position and payload such that the payload may indicate the term is valid for a certain version based on a position offset. For example, if the segment differential-based document text-index modeling program 110A, 110B checks the terms from beginning of both token streams from two versions of a document and determines that both streams have the same terms at the same positions, then the segment differential-based document text-index modeling program 110A, 110B may store the terms without extra information. However, if a term is modified at a position, the segment differential-based document text-index modeling program 110A, 110B may store the new term with a payload indicating that this term is only valid after a certain version number and add the previous term with a payload indicating this term is only valid before a certain version.

At 234, the segment differential-based document text-index modeling program 110A, 110B inserts the merged document into the index, keeping the merged segments in a storage in the same, or similar, manner as described in step 224.

Figure 3:
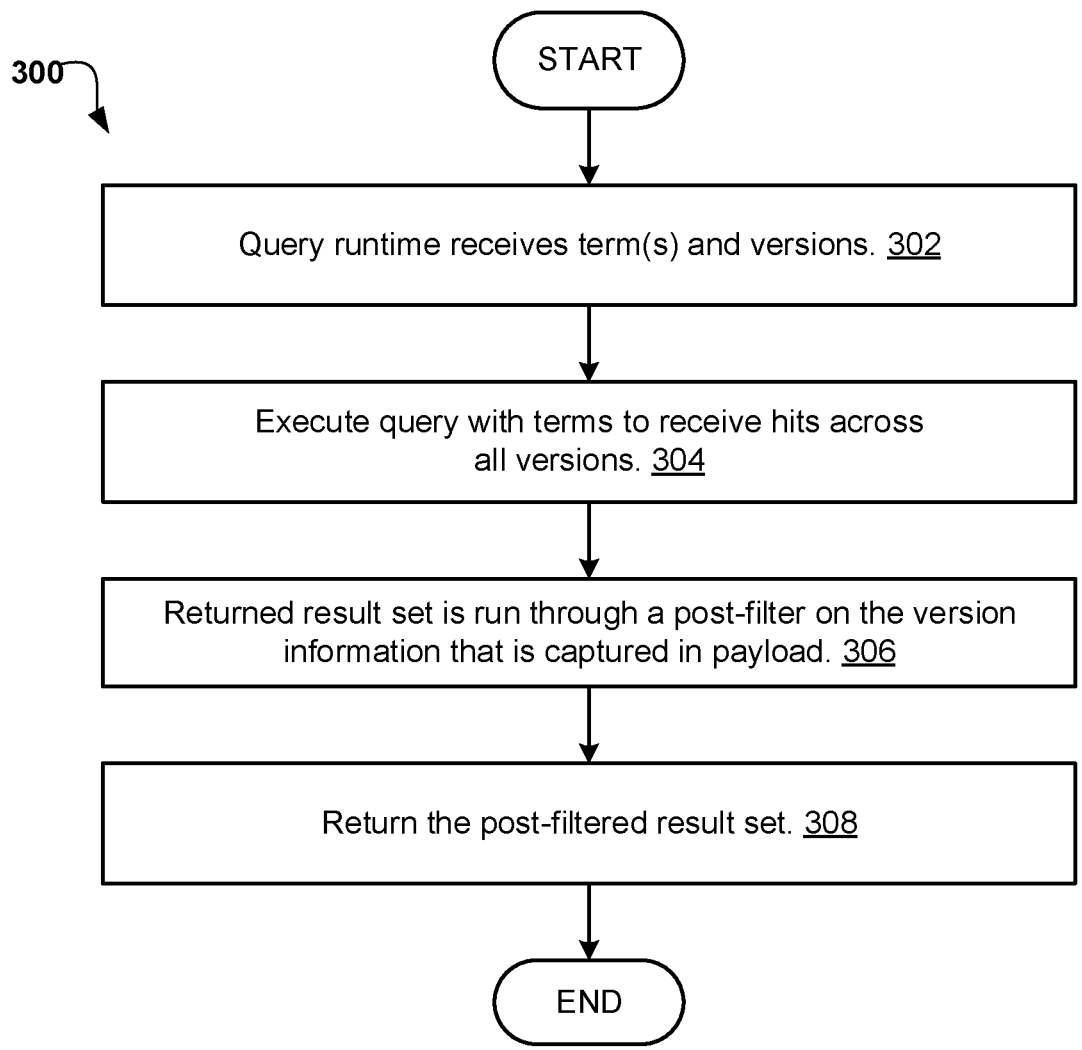
FIG. 3 is an operational flowchart illustrating a running of query for a specific term in a specific version of a document according to at least one embodiment.

FIG. 3 is an operational flowchart illustrating a running of query for a specific query term in a specific version of a document. At 302, query runtime receives terms and versions. According to one embodiment, the term query may be executed on the segment differential-based document text-index modeling program 110B which may follow the standard process of an index query execution, or of dictionary look-up of the query terms and returning a posting list associated with the relevant terms. The result set may be post filtered for the prescribed document version as specified by the query at 306. If the result-set contains the specified version, then version-matching results may be retuned at 308. The other types of the indexing queries may be executed as described by the existing text-indexing query infrastructure.

At 304, the segment differential-based document text-index modeling program 110A, 110B executes the query with terms to receive hits across all versions. According to one embodiment, the segment differential-based document text-index modeling program 110A, 110B may load posting lists for a particular term and payloads of each positions from all versions of a document or analyze token positions that are shared among all versions to search for a particular term.

At 306, the returned result set is run through a post-filter on the version information that is captured in payload. According to one embodiment, the segment differential-based document text-index modeling program 110A, 110B may allow a user to dynamically switch search options by specifying which version(s) the user likes to search. For example, if the option is "search for a term in the latest version only", then the segment differential-based document text-index modeling program 110A, 110B may look into an index and find a posting list for the term. If the option is "search for a term in all version" then the segment differential-based document text-index modeling program 110A, 110B may load the posting lists for the term with and without special marks, and load payloads of each position and construct logical documents which may have text from all the versions. If the option is "search for a term in specific version(s)", the segment differential-based document text-index modeling program 110A, 110B may then load posting lists for the term with and without special marks, and load payloads indicating the specific positions of the terms and construct logical documents which may contain text from the specified version(s).

At 308, the segment differential-based document text-index modeling program 110A, 110B returns the post-filtered result set. According to one embodiment, the segment differential-based document text-index modeling program 110A, 110B may return the post-filtered result set and display the result set to a user indicating whether particular terms were found in a specific version of a document or all versions of a document.

It may be appreciated that FIGS. 2A-2C and FIG. 3 provide only an illustration of one implementation and do not imply any limitations with regard to how different embodiments may be implemented. Many modifications to the depicted environments may be made based on design and implementation requirements. For example, in at least one embodiment, the segment differential-based document text-index modeling program 110A, 110B may create a term vector storing a unique sentence as a unit and store hash of each segment, as defined as terms, words, and sentences.

Figure 4:
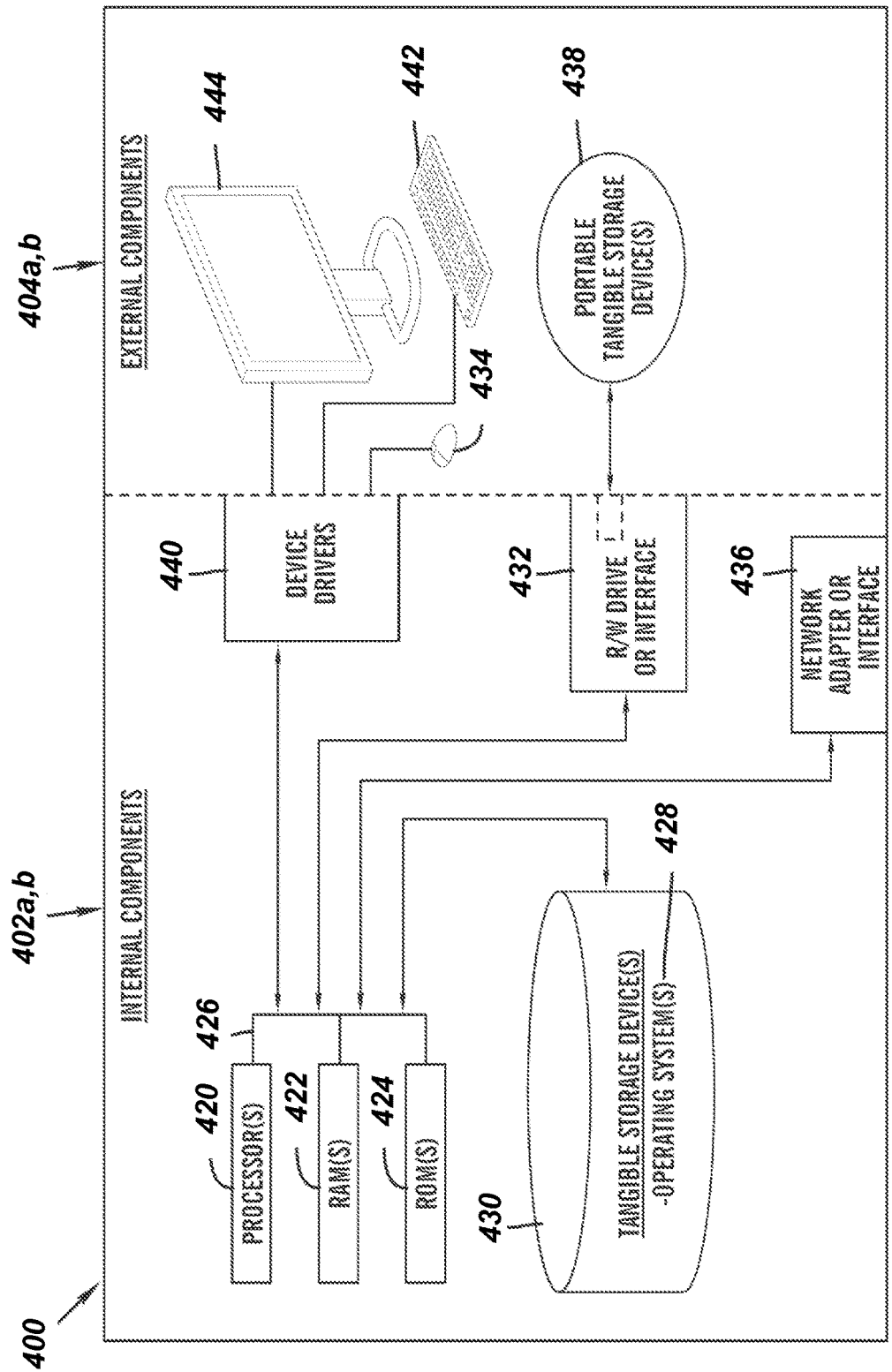
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a, b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the segment differential-based document text-index modeling program 110A in the client computing device 102 and the segment differential-based document text-index modeling program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the segment differential-based document text-index modeling program 110A, 110B can be stored on one or more of the respective portable computer-readable tangible storage devices 438, read via the respective R/W drive or interface 432 and loaded into the respective hard drive 430.

Each set of internal components 402 a, b also includes network adapters or interfaces 436 such as a TCP/IP adapter cards, wireless Wi-Fi interface cards, or 3G or 4G wireless interface cards or other wired or wireless communication links. The software program 108 and the segment differential-based document text-index modeling program 110A in the client computing device 102 and the segment differential-based document text-index modeling program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the segment differential-based document text-index modeling program 110A in the client computing device 102 and the segment differential-based document text-index modeling program 110B in the server 112 are loaded into the respective hard drive 430. The network may comprise copper wires, optical fibers, wireless transmission, routers, firewalls, switches, gateway computers and/or edge servers.

Each of the sets of external components 404 a, b can include a computer display monitor 444, a keyboard 442, and a computer mouse 434. External components 404 a, b can also include touch screens, virtual keyboards, touch pads, pointing devices, and other human interface devices.

Each of the sets of internal components 402 a, b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
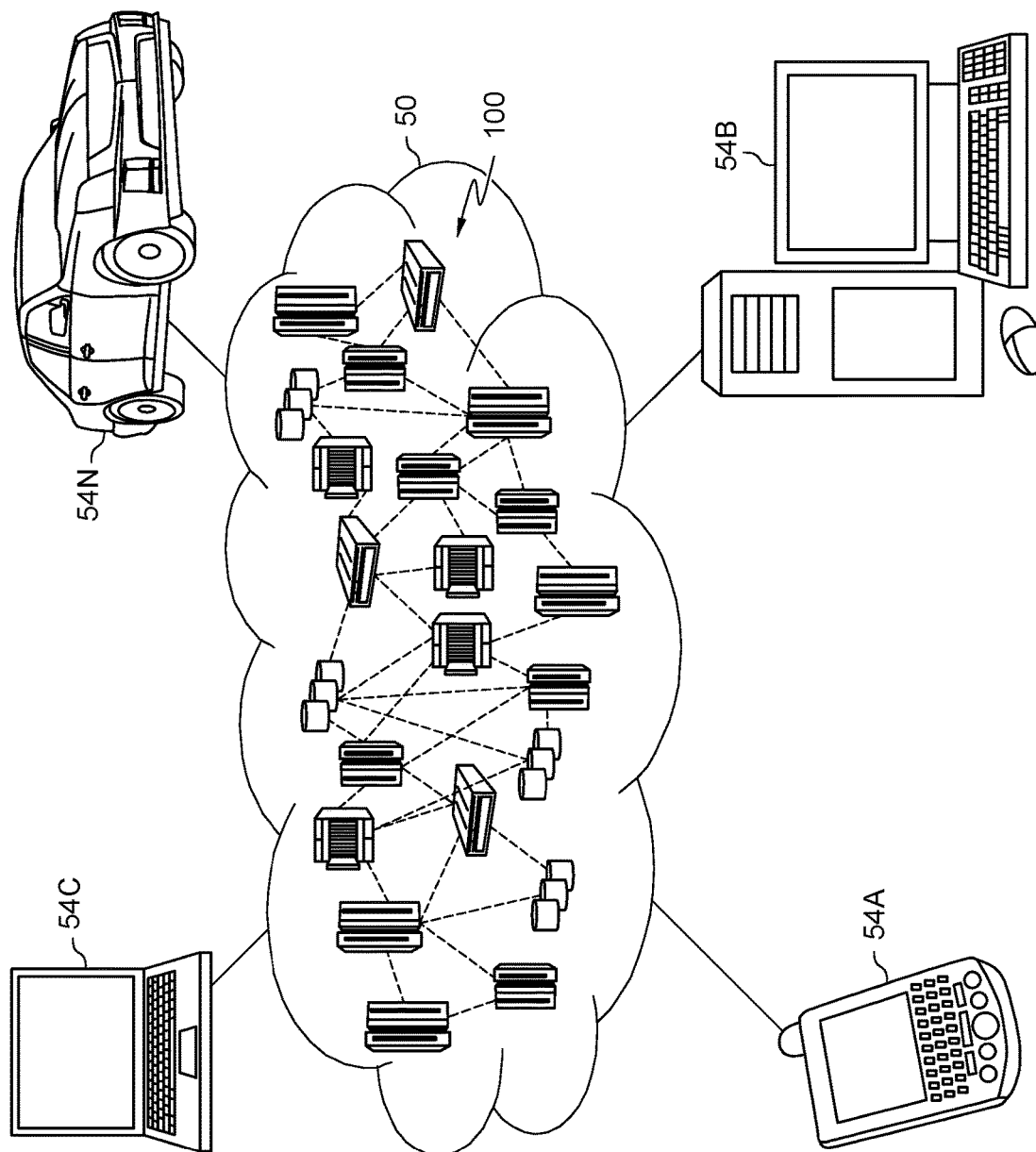
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
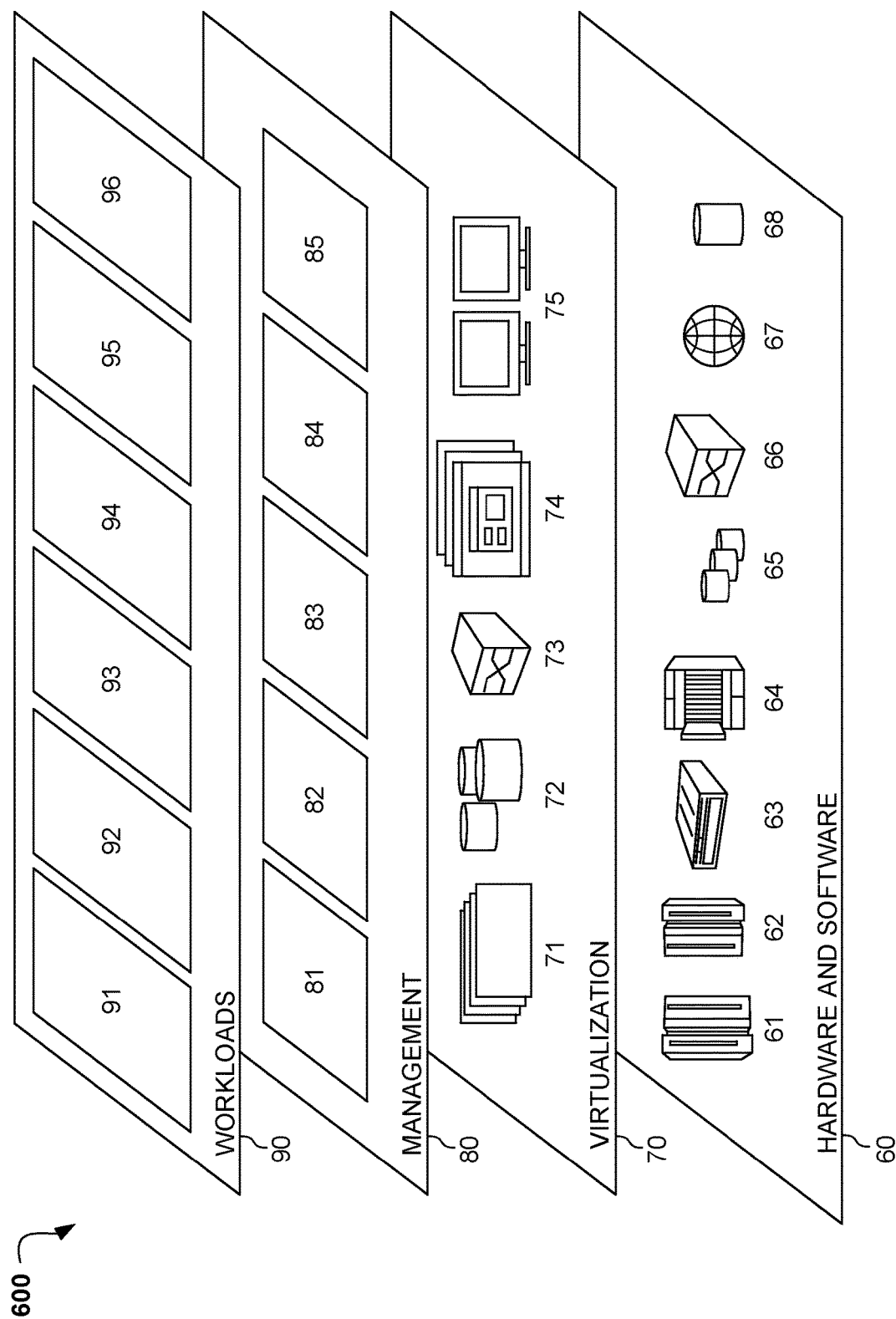
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and segment differential-based document text-index modeling 96. Segment differential-based document text-index modeling 96 may relate to tokenizing a newly added document and comparing token streams of multiple versions of a document, monitoring a database of previously saved documents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for storing and processing a query in a document corpus utilizing a segment level differential document text-index model, the method comprising:
   receiving, by a processor, a document with a valid document ID and version ID tuple;

determining the received document is a new version of a previously stored document and, consequently, multiplexing multiple versions of the document into a single indexed document;
segmenting the received document and building a token vector;
calculating a difference between the received new version of the document and the previously stored document using information obtained from the segmentation;
in response to the calculated difference being below a pre-configured threshold value, discarding the received new version;
in response to the calculated difference exceeding the pre-configured threshold value, updating the token vector and an index with a token stream of the received new version of the document;
executing a query with terms to receive hits across all versions of the document, wherein posting lists for a particular term and payloads of each position from the all versions of the documents are loaded, wherein token positions that are shared among the all versions of the document are analyzed to search for the particular term; and
displaying a result set to a user indicating that the particular term was found among the all versions of the document.

2. The method of claim 1, wherein the difference is calculated based on cumulative differentials between segments of the current version of the document and the previous version of the document.

3. The method of claim 1, wherein the difference is calculated based on semantic differences between segments of the current version and the previous version of the document.

4. The method of claim 1, wherein the difference is calculated based on counting a total number of words in each version of the document.

5. The method of claim 1, wherein the difference is measured based on a comparison of each token vector of each document.

6. The method of claim 1, further comprising:
generating a version-specific payload for each token which indicates when a new term is detected in the new version.

7. The method of claim 1, further comprising:
modifying a term string when adding the token stream to an index by placing special characters or marks at the end of a token to indicate the term string is valid after a preconfigured number of document versions.

8. The method of claim 1, further comprising:
storing token vectors as separate data when a difference between two token streams exceeds a pre-configured threshold value.

9. The method of claim 1, further comprising:
loading a posting list of a term and a term with special marks or characters when a user searches for a term in specified versions of a document;
loading a payload of each term indicating each position and version; and
using version information to filter a requisite query result.

10. A computer system for avoiding a high object version explosion in processing a query in a document utilizing a segment differential-based document text-index modeling, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving, by a processor, a document with a valid document ID and version ID tuple;
determining the received document is a new version of a previously stored document and, consequently, multiplexing multiple versions of the document into a single indexed document;
segmenting the received document and building a token vector;
calculating a difference between the received new version of the document and the previously stored document using information obtained from the segmentation;
in response to the calculated difference being below a pre-configured threshold value, discarding the received new version;
in response to the calculated difference exceeding the pre-configured threshold value, updating the token vector and an index with a token stream of the received new version of the document;
executing a query with terms to receive hits across all versions of the document, wherein posting lists for a particular term and payloads of each position from the all versions of the documents are loaded, wherein token positions that are shared among the all versions of the document are analyzed to search for the particular term; and
displaying a result set to a user indicating that the particular term was found among the all versions of the document.

11. The computer system of claim 10, wherein the difference is calculated based on cumulative differentials between segments of the current version of the document and the previous version of the document.

12. The computer system of claim 10, wherein the difference is calculated based on semantic differences between segments of the current version and the previous version of the document.

13. The computer system of claim 10, wherein the difference is calculated based on counting a total number of words in each version of the document.

14. The computer system of claim 10, wherein the difference is measured based on a comparison of each token vector of each document.

15. The computer system of claim 10, further comprising:
generating a version-specific payload for each token which indicates when a new term is detected in the new version.

16. The computer system of claim 10, further comprising:
modifying a term string when adding the token stream to an index by placing special characters or marks at the end of a token to indicate the term string is valid after a preconfigured number of document versions.

17. The computer system of claim 10, further comprising:
storing token vectors as separate data when a difference between two token streams exceeds a pre-configured threshold value.

18. The computer system of claim 10, further comprising:
loading a posting list of a term and a term with special marks or characters when a user searches for a term in specified versions of a document;
loading a payload of each term indicating each position and version; and
using version information to filter a requisite query result.

19. A computer program product for avoiding a high object version explosion in processing a query in a document utilizing a segment differential-based document text-index modeling, the computer program product comprising:

one or more computer-readable tangible storage media and program instructions stored on at least one of the one or more tangible storage media, the program instructions executable by a processor of a computer to perform a method, the method comprising:

receiving, by a processor, a document with a valid document ID and version ID tuple;

determining the received document is a new version of a previously stored document and, consequently, multiplexing multiple versions of the document into a single indexed document;

segmenting the received document and building a token vector;

calculating a difference between the received new version of the document and the previously stored document using information obtained from the segmentation;

in response to the calculated difference being below a pre-configured threshold value, discarding the received new version;

in response to the calculated difference exceeding the pre-configured threshold value, updating the token vector and an index with a token stream of the received new version of the document;

executing a query with terms to receive hits across all versions of the document, wherein posting lists for a particular term and payloads of each position from the all versions of the documents are loaded, wherein token positions that are shared among the all versions of the document are analyzed to search for the particular term; and displaying a result set to a user indicating that the particular term was found among the all versions of the document.

20. The computer program product of claim 19, wherein the difference is calculated based on cumulative differentials between segments of the current version of the document and the previous version of the document.

* * * * *